(12) United States Patent
Tada et al.

(10) Patent No.: US 11,079,113 B2
(45) Date of Patent: Aug. 3, 2021

(54) FUEL INJECTOR AND GAS TURBINE

(71) Applicant: Mitsubishi Hitachi Power Systems, Ltd., Kanagawa (JP)

(72) Inventors: Katsuyoshi Tada, Tokyo (JP); Kei Inoue, Yokohama (JP); Satoshi Tanimura, Yokohama (JP); Keijiro Saito, Tokyo (JP)

(73) Assignee: MITSUBISHI POWER, LTD., Kanagwa (JP)

( * ) Notice: Subject to any disclaimer, the term of this patent is extended or adjusted under 35 U.S.C. 154(b) by 113 days.

(21) Appl. No.: 16/607,968

(22) PCT Filed: Apr. 27, 2018

(86) PCT No.: PCT/JP2018/017189
§ 371 (c)(1),
(2) Date: Oct. 24, 2019

(87) PCT Pub. No.: WO2018/199289
PCT Pub. Date: Nov. 1, 2018

(65) Prior Publication Data
US 2021/0102703 A1 Apr. 8, 2021

(30) Foreign Application Priority Data

Apr. 28, 2017 (JP) .............................. JP2017-090705

(51) Int. Cl.
*F23R 3/28* (2006.01)
*F02C 7/22* (2006.01)

(52) U.S. Cl.
CPC .............. *F23R 3/286* (2013.01); *F02C 7/222* (2013.01); *F23R 3/283* (2013.01);
(Continued)

(58) Field of Classification Search
CPC ...................................................... F23R 3/286
See application file for complete search history.

(56) References Cited

U.S. PATENT DOCUMENTS 8,112,999 B2 2/2012 Zuo
8,438,851 B1 5/2013 Uhm et al.
(Continued)

FOREIGN PATENT DOCUMENTS

CN 101675227 3/2010
CN 102032594 4/2011
(Continued)

OTHER PUBLICATIONS

International Search Report dated Jul. 24, 2018 in International (PCT) Application No. PCT/JP2018/017189, with English-language Translation.
(Continued)

*Primary Examiner* — Ehud Gartenberg
*Assistant Examiner* — Roberto Toshiharu Igue
(74) *Attorney, Agent, or Firm* — Wenderoth, Lind & Ponack, L.L.P.

(57) ABSTRACT

A fuel injector including a fuel supply tube (8), a plurality of premix tubes (2), a support plate (3) which supports the fuel supply tube and the plurality of premix tubes, a substrate which supports downstream end portions of the plurality of premix tubes, an outer wall which is cylindrical, which forms a plenum (P) inside, a partition plate which partitions the plenum (P) into a fuel plenum (PF) and a cooling air plenum (PA), a baffle which partitions the cooling air plenum (PA) into an upstream cooling air plenum (PA1) and a downstream cooling air plenum (PA2) and has a plurality of cooling holes formed therein, and a cooling air supply tube configured to supply cooling air to the upstream cooling air plenum (PA1), in which the end portion on the downstream side of the fuel supply tube opens in the fuel plenum (PF), and a fuel introduction hole.

11 Claims, 8 Drawing Sheets

(52) U.S. Cl.
CPC .... *F05D 2240/35* (2013.01); *F05D 2260/201* (2013.01); *F05D 2260/213* (2013.01); *F05D 2260/2212* (2013.01); *F05D 2260/232* (2013.01)

(56) References Cited

U.S. PATENT DOCUMENTS

| | | | |
|---|---|---|---|
| 8,955,327 B2 | 2/2015 | Barker et al. | |
| 2010/0180601 A1 | 7/2010 | Ishiguro et al. | |
| 2010/0252652 A1 | 10/2010 | Johnson et al. | |
| 2011/0073684 A1 | 3/2011 | Johnson et al. | |
| 2013/0086912 A1* | 4/2013 | Berry | F23R 3/286 60/746 |
| 2013/0098063 A1 | 4/2013 | Mizukami et al. | |
| 2013/0318977 A1 | 12/2013 | Berry et al. | |
| 2014/0033718 A1* | 2/2014 | Manoharan | F23R 3/46 60/725 |

FOREIGN PATENT DOCUMENTS

| | | |
|---|---|---|
| CN | 102971510 | 3/2013 |
| CN | 103185353 | 7/2013 |
| CN | 103453554 | 12/2013 |
| EP | 2 613 083 | 7/2013 |
| EP | 2 669 580 | 12/2013 |
| JP | 2011-069602 | 4/2011 |
| JP | 2013-139993 | 7/2013 |
| JP | 2013-250046 | 12/2013 |
| JP | 2015-222023 | 12/2015 |

OTHER PUBLICATIONS

Written Opinion dated Jul. 24, 2018 in International (PCT) Application No. PCT/JP2018/017189, with English-language Translation.

* cited by examiner

FUEL INJECTOR AND GAS TURBINE

TECHNICAL FIELD

The present invention relates to a fuel injector and a gas turbine.

Priority is claimed on Japanese Patent Application No. 2017-090705, filed Apr. 28, 2017, the content of which is incorporated herein by reference.

BACKGROUND ART

In a gas turbine, when a fuel gas is supplied to a combustor, compressed air and the fuel gas are uniformly mixed in advance by a fuel injector and injected in a mist state.

As such a fuel injector, for example, Patent Document 1 discloses a fuel injector which ejects a mixed gas of compressed air and a fuel gas from a plurality of ejection holes regularly formed on a circular substrate. In such a fuel injector, a flame may become an adhering flame which adheres to an outlet of injection holes, causing a substrate to reach a high temperature, and thus the substrated needs to be cooled.

CITATION LIST

Patent Literature

[Patent Document 1]
Japanese Unexamined Patent Application, First Publication No. 2011-69602

SUMMARY OF THE INVENTION

Technical Problem

Incidentally, in the fuel injector described in Patent Document 1, although the fuel injector has been kept at a low temperature by re-examining a shape of a baffle provided inside a casing into which a fuel gas is introduced, further measures are desired as measures for a substrate reaching a high temperature.

An objective of the present invention is to provide a fuel injector and a gas turbine capable of efficiently cooling a substrate reaching a high temperature.

Solution to Problem

According to a first aspect of the present invention, a fuel injector includes a fuel supply tube which has a tubular shape centered on an axis and into which a fuel gas is introduced from an upstream side in an axial direction in which the axis extends, a plurality of premix tubes which have a tubular shape extending in the axial direction and into which air is introduced from the upstream side, a support plate which supports a downstream side in the axial direction of the fuel supply tube and upstream end portions of the plurality of premix tubes, a substrate which supports downstream end portions of the plurality of premix tubes, an outer wall which is connects the support plate to the substrate and forms a plenum inside together with the support plate and the substrate, a partition plate which partitions the plenum into a fuel plenum and a cooling air plenum disposed downstream of the fuel plenum, a baffle which is disposed downstream of the partition plate, which partitions the cooling air plenum into an upstream cooling air plenum and a downstream cooling air plenum that is disposed downstream of the upstream cooling air plenum, and which includes a plurality of cooling holes formed therein, and a cooling air supply tube which is configured to supply cooling air to the upstream cooling air plenum, in which the end portion on the downstream side of the fuel supply tube opens in the fuel plenum, and a fuel introduction hole which penetrates each of the premix tubes inward and outward is formed at a portion positioned in the fuel plenum of the premix tube.

According to such a configuration, the cooling air introduced into the upstream cooling air plenum is injected toward the substrate through the cooling holes of the baffle, and thereby the substrate that reaches a high temperature can be efficiently cooled.

In the above-described fuel injector, at least some of the plurality of cooling holes may be impingement holes.

In the above-described fuel injector, the baffle may include a baffle main body in which the cooling holes are formed and which is provided radially inside with the axis as a center, and an inclined part which is disposed between the baffle main body and the outer wall, which is inclined radially outward on the downstream side with the axis as a center, and in which the cooling holes are not formed.

According to such a configuration, the cooling air introduced into the upstream cooling air plenum is injected from the plurality of cooling holes to the downstream cooling air plenum, and then flows outward in the radial direction along the inclined part while cooling the substrate. The cooling air introduced into the downstream cooling air plenum is oriented outward in the radial direction along the inclined part of the baffle. Thereby, not only the substrate but also the premix tube in the downstream cooling air plenum can be cooled.

The above-described fuel injector may include a plurality of cooling air discharge holes formed in the substrate and configured to discharge the cooling air from the downstream cooling air plenum to the downstream side of the substrate.

According to such a configuration, a flame generated by an injection of the fuel gas and the compressed air can be prevented from adhering to an outlet of the premix tube. Also, even when a flame adheres thereto, a temperature of the flame itself can be lowered.

In the above-described fuel injector, a cooling air introduction hole penetrating the premix tube inward and outward may be formed at a portion positioned in the downstream cooling air plenum of the premix tube.

According to such a configuration, a portion of the cooling air that has cooled the substrate is introduced into the premix tube, and thereby a flame moving upstream can be suppressed.

In the above-described fuel injector, the cooling air supply tube may be disposed coaxially with the fuel supply tube on a radial inner side of the fuel supply tube.

According to such a configuration, an increase in temperature of the cooling air can be inhibited. That is, the cooling air supply tube can be connected to the plenum without being exposed to the compressed air.

According to a second aspect of the present invention, a fuel injector includes a fuel supply tube which has a tubular shape centered on an axis and into which a fuel gas is introduced from an upstream side in an axial direction in which the axis extends, a plurality of premix tubes which have a tubular shape extending in the axial direction and into which air is introduced from the upstream side, a support plate which supports a downstream side of the fuel supply tube and upstream end portions of the plurality of premix tubes, a substrate which supports downstream end portions of the plurality of premix tubes, an outer wall which is cylindrical, which connects the support plate to the substrate and forms a plenum inside together with the support plate and the substrate, a partition plate which partitions the plenum into a fuel plenum and a cooling air plenum disposed downstream of the fuel plenum, a cooling air supply tube which is configured to supply cooling air to the cooling air plenum, and a baffle which is provided downstream of a downstream end portion of the cooling air supply tube and having an enlarged diameter part which is inclined radially outward on the downstream side with the axis as a center and connected to the outer wall, and a cooling air inflow hole which is formed at a center in a radial direction with the axis of the enlarged diameter part as a center and into which the cooling air supplied from the cooling air supply tube flows, in which a fuel introduction hole which penetrates each of the premix tubes inward and outward is formed at a portion positioned in the fuel plenum of the premix tube.

According to such a configuration, the cooling air that has flowed in from the cooling air inflow hole flows outward in the radial direction along the enlarged diameter part while cooling a vicinity of a center of the substrate. That is, the cooling air is oriented outward in the radial direction along the enlarged diameter part of the baffle. Thereby, the substrate that reaches a high temperature can be efficiently cooled, and the premix tube in the cooling air plenum can also be cooled.

According to a third aspect of the present invention, a gas turbine includes a compressor which is configured to generate compressed air in which air is compressed, a combustor which includes any one of the above-described fuel injectors and mixes fuel with the compressed air to generate a combustion gas, an air extraction part which is configured to extract the compressed air generated by the compressor, a forced air-cooling compressor which is configured to further compress the extracted compressed air, and a cooling air introduction part which introduces the cooling air generated by the forced air-cooling compressor into the fuel injector.

According to such a configuration, the compressed air generated by the compressor is re-pressurized, and thereby cooling air having a higher pressure than that of the extracted compressed air can be supplied.

The above-described gas turbine may include a cooler which is configured to cool the compressed air extracted by the air extraction part.

According to such a configuration, the compressed air is cooled using the cooler, and thereby cooling air having a lower temperature than that of the extracted compressed air can be supplied.

Advantageous Effects of Invention

According to the present invention, cooling air introduced into the upstream cooling air plenum is injected toward the substrate through the cooling holes of the baffle, and thereby a substrate that reaches a high temperature can be efficiently cooled.

DESCRIPTION OF EMBODIMENTS

First Embodiment

Hereinafter, a gas turbine 100 including a fuel injector 1 of a first embodiment of the present invention will be described in detail with reference to the drawings.

Figure 1:
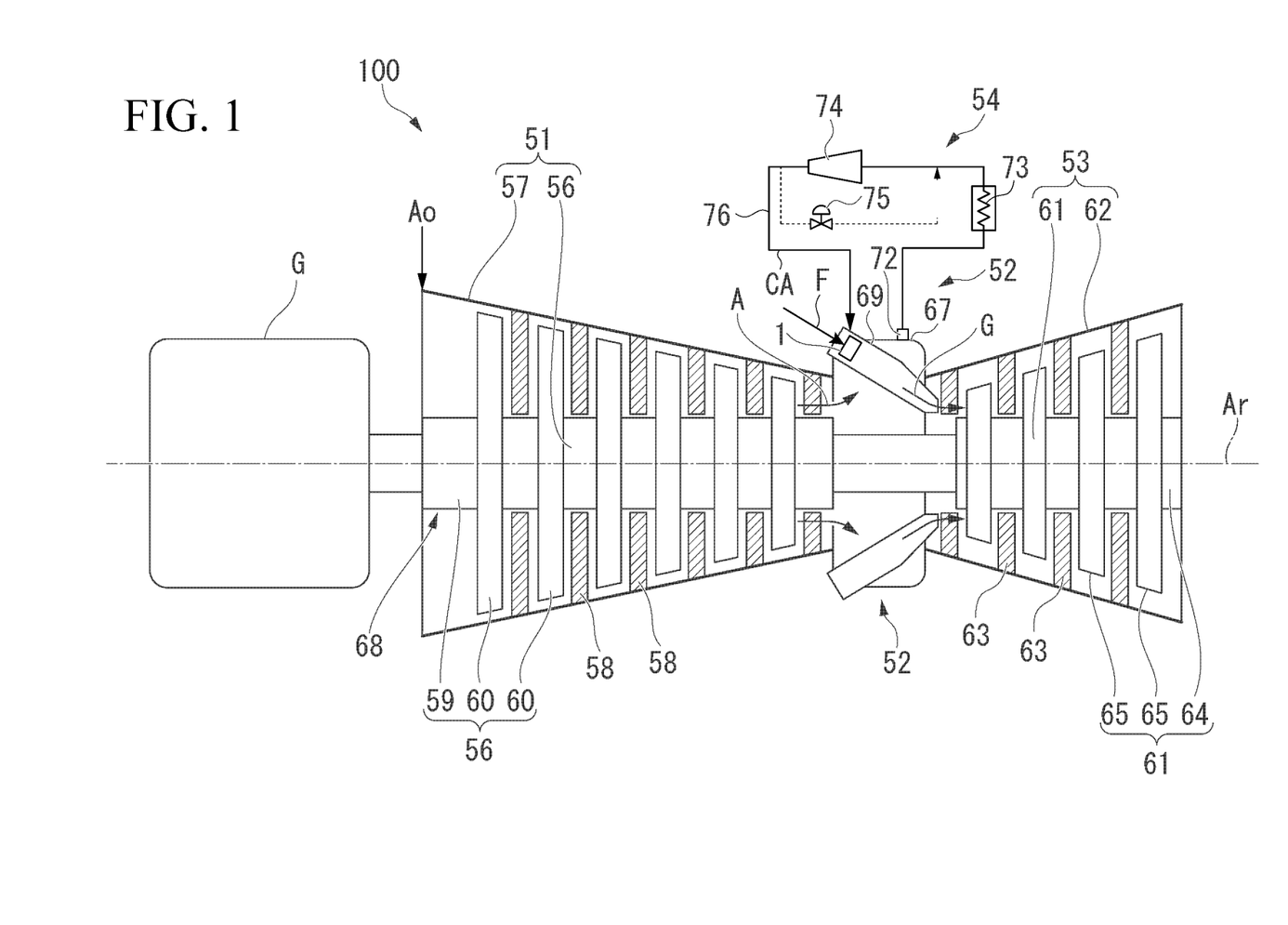
FIG. 1 is a configuration view showing a schematic configuration of a gas turbine of a first embodiment of the present invention.

As shown in FIG. 1, the gas turbine 100 of the present embodiment includes a compressor 51 which compresses outside air Ao to generate compressed air A, a plurality of combustors 52 which burn a mixed gas of the compressed air A and a fuel gas F and generate a combustion gas G, a turbine 53 driven by the combustion gas G, and a cooling device 54 which cools an object to be cooled of the gas turbine 100.

The compressor 51 includes a compressor rotor 56 which rotates around a gas turbine axis Ar, a compressor casing 57 which rotatably covers the compressor rotor 56, and a plurality of compressor vane rows 58.

The compressor rotor 56 includes a compressor rotor shaft 59 extending along the gas turbine axis Ar, and a plurality of compressor blade rows 60 attached to the compressor rotor shaft 59. The plurality of compressor blade rows 60 are aligned in an axial direction of the gas turbine axis Ar. Each of the compressor blade rows 60 is configured of a plurality of blades aligned in a circumferential direction around the gas turbine axis Ar. The compressor vane rows 58 are respectively disposed downstream of the plurality of compressor blade rows 60. All of the compressor vane rows 58 are fixed inside the compressor casing 57. Each of the compressor vane rows 58 is configured of a plurality of vanes aligned in the circumferential direction around the gas turbine axis Ar.

The turbine 53 includes a turbine rotor 61 which rotates around the gas turbine axis Ar, a turbine casing 62 which rotatably covers the turbine rotor 61, and a plurality of turbine vane rows 63. The turbine rotor 61 includes a turbine rotor shaft 64 extending along the gas turbine axis Ar, and a plurality of turbine blade rows 65 attached to the turbine rotor shaft 64.

The plurality of turbine blade rows 65 are aligned in the axial direction of the gas turbine axis Ar. Each of the plurality of turbine blade rows 65 is configured of a plurality of blades aligned in the circumferential direction around the gas turbine axis Ar. The turbine vane rows 63 are respectively disposed upstream of the plurality of turbine blade rows 65. All of the turbine vane rows 63 are fixed inside the turbine casing 62. Each of the turbine vane rows 63 is configured of a plurality of vanes aligned in the circumferential direction around the gas turbine axis Ar.

The gas turbine 100 further includes a cylindrical intermediate casing 67 with the gas turbine axis Ar as a center. The intermediate casing 67 is disposed between the compressor casing 57 and the turbine casing 62 in the axial direction of the gas turbine axis Ar. The compressor rotor 56 and the turbine rotor 61 are positioned on the same gas turbine axis Ar and connected to each other to form a gas turbine rotor 68. For example, a rotor of a generator G may be connected to the gas turbine rotor 68.

The combustor 52 generates the combustion gas G at high temperature and high pressure by supplying the fuel gas F to the compressed air A compressed by the compressor 51.

The plurality of combustors 52 are fixed to the intermediate casing 67 at intervals in the circumferential direction around the gas turbine axis Ar. Each of the combustors 52 includes the fuel injector 1, and a combustor liner 69. The combustor liner 69 burns a gas which is mixed with the compressed air A injected from the fuel injector 1 and the fuel gas F, and guides the combustion gas G to the turbine 53.

The outside air Ao taken into the compressor 51 is compressed by passing through the plurality of compressor vane rows 58 and compressor blade rows 60 and then becomes the compressed air A at high temperature and high pressure. The fuel gas F is mixed with the compressed air A and burned in the combustor 52, and thereby the combustion gas G at high temperature and high pressure is generated. Then, the turbine rotor shaft 64 is rotationally driven by the combustion gas G passing through the turbine vane rows 63 and the turbine blade rows 65 of the turbine 53, and rotational power is applied to the generator G connected to the gas turbine rotor 68 to perform power generation.

The cooling device 54 is a device that extracts a portion of the compressed air A supplied to the combustor 52 and compresses the compressed air A again to cool an object to be cooled of the gas turbine 100. The object to be cooled is a component that is exposed to a high temperature.

The cooling device 54 includes an air extraction part 72 which extracts a portion of the compressed air A, a cooler 73 which cools the extracted compressed air A, a forced air-cooling compressor 74 which further compresses the compressed air A cooled by the cooler 73 into cooling air CA, an anti-surge valve 75 for preventing a surge of the forced air-cooling compressor 74, and a cooling air introduction part 76 which introduces the cooling air CA into the fuel injector 1 of the combustor 52. The cooling air introduction part 76 is connected to a cooling air supply tube 9 of the fuel injector 1.

For the explanation, in FIG. 1, one system of the cooling device 54 is provided for one gas turbine 100. A plurality of systems of the cooling device 54 may be provided for one gas turbine 100.

The compressed air A compressed again by the forced air-cooling compressor 74 is supplied as the cooling air CA to the fuel injector 1 of the combustor 52 via the cooling air introduction part 76. The cooling air CA may be supplied to other objects to be cooled of the gas turbine 100 such as, for example, the vanes.

Figure 2:
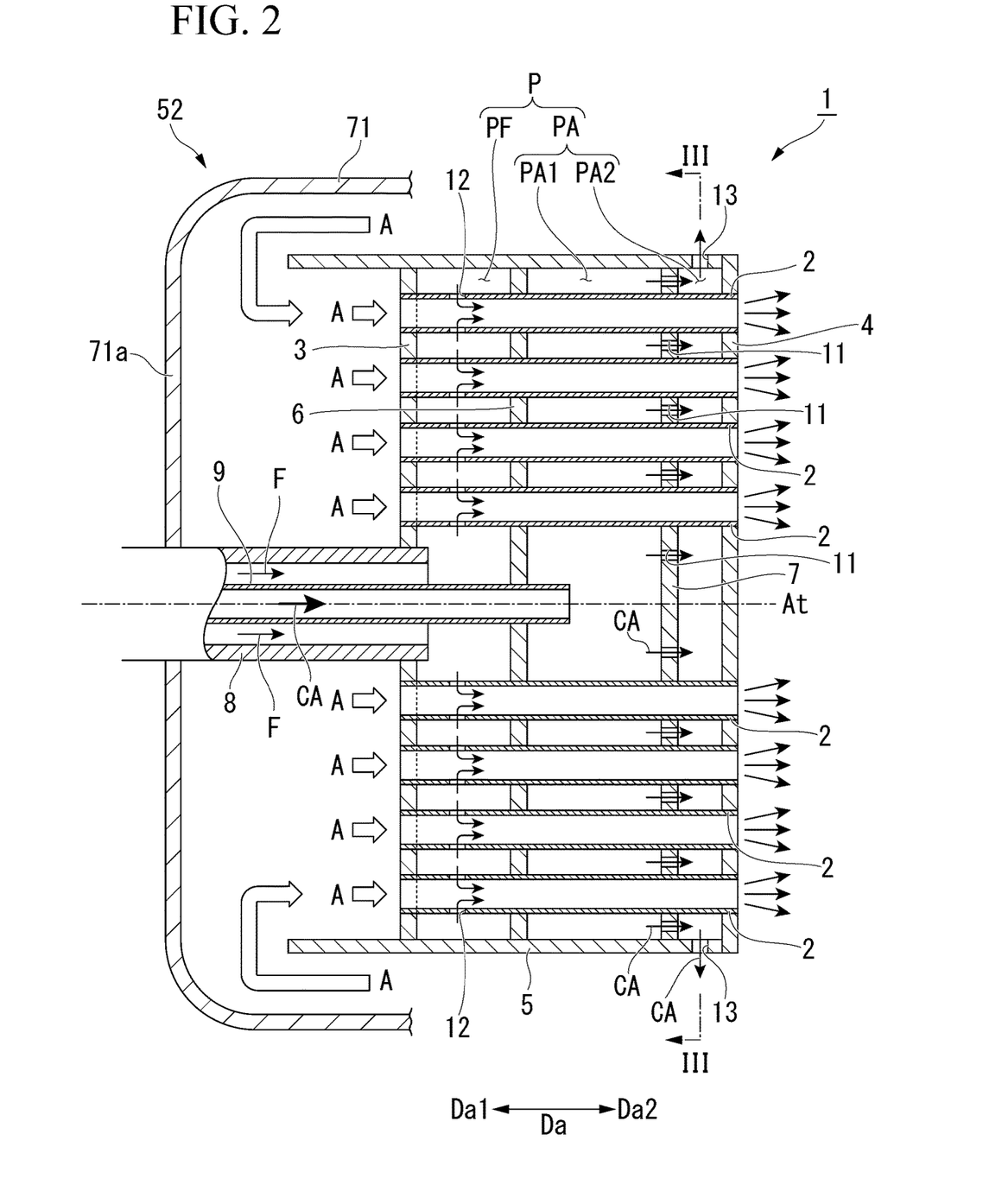
FIG. 2 is a longitudinal sectional view showing a fuel injector of the first embodiment of the present invention.

As shown in FIG. 2, the combustor 52 includes a cylindrical outer shell 71 and the fuel injector 1 disposed inside the outer shell 71. The compressed air A introduced from between the outer shell 71 and the fuel injector 1 is rotated by 180° at an end wall 71a of the outer shell 71 and is supplied to the fuel injector 1.

The fuel injector 1 of the present embodiment includes a fuel supply tube 8 which supplies the fuel gas F, a plurality of premix tubes 2, a support plate 3 which supports end portions on an upstream side Da1 of the plurality of premix tubes 2, a substrate 4 which supports end portions of a downstream side Da2 of the plurality of premix tubes 2, a cylindrical outer wall 5 which forms a plenum P inside, a partition plate 6 which partitions the plenum P into a fuel plenum PF and a cooling air plenum PA, a baffle 7 disposed on the downstream side Da2 of the partition plate 6, and the cooling air supply tube 9 which supplies the cooling air CA to the cooling air plenum PA.

The baffle 7 partitions the cooling air plenum PA into an upstream cooling air plenum PA1 and a downstream cooling air plenum PA2 disposed on the downstream side Da2 of the upstream cooling air plenum PA1. A main surface of the support plate 3, a main surface of the partition plate 6, a main surface of the baffle 7, and a main surface of the substrate 4 are perpendicular to an axis At of the fuel supply tube 8.

In the following description, a direction in which the axis At of the fuel supply tube 8 extends is referred to as an axial direction Da. Also, a direction perpendicular to the axis At is referred to as a radial direction, a side away from the axis At in the radial direction is referred to as a radially outward side, and a side of coming closer to the axis At in the radial direction is referred to as a radially inward side. Also, a side into which the fuel gas F is introduced in the axial direction Da (left side as viewed in FIG. 2) is referred to the upstream side Da1, and a side from which the fuel gas F is injected in the axial direction Da (right side as viewed in FIG. 2) is referred to as the downstream side Da2. That is, in the fuel injector 1 of the present embodiment, the fuel gas F and the compressed air A flow from the upstream side Da1 toward the downstream side Da2.

In the fuel injector 1, the fuel gas F is introduced from the upstream side Da1 by the fuel supply tube 8. In the fuel injector 1, the introduced fuel gas F is mixed with the compressed air A in the premix tubes 2, and then injected toward the downstream side Da2 to be discharged.

The fuel supply tube 8 causes the fuel gas F supplied from the upstream side Da1 to flow to the fuel plenum PF. The fuel supply tube 8 extends in a tubular shape with the axis At as a center. The fuel supply tube 8 is connected to the support plate 3 on the downstream side Da2.

An end portion on the downstream side Da2 of the fuel supply tube 8 opens in the fuel plenum PF. That is, a position in the axial direction Da of the end portion on the downstream side Da2 of the fuel supply tube 8 is the downstream side Da2 of the support plate 3 and the upstream side Da1 of the partition plate 6.

The cooling air supply tube 9 causes the cooling air CA supplied from the cooling device 54 (the upstream side Da1) to flow to the upstream cooling air plenum PA1. The cooling air supply tube 9 is disposed coaxially with the fuel supply tube 8 on a radial inner side of the fuel supply tube 8. That is, the fuel gas F flows through a gap in the radial direction between the cooling air supply tube 9 and the fuel supply tube 8. An end portion on the downstream side Da2 of the cooling air supply tube 9 opens in the upstream cooling air plenum PA1. That is, a position in the axial direction Da of the end portion on the downstream side Da2 of the cooling air supply tube 9 is the downstream side Da2 of the partition plate 6 and the upstream side Da1 of the baffle 7.

The support plate 3 has a disc shape with the axis At as a center and has a circular through hole formed at a center thereof. The through hole is formed to have the same diameter as an outer diameter of the fuel supply tube 8. The support plate 3 is connected to the fuel supply tube 8 in a state in which an end portion of the fuel supply tube 8 is inserted into the through hole to protrude to the downstream side Da2. A plurality of through holes for inserting and supporting the plurality of premix tubes 2 are formed in the support plate 3.

The substrate 4 has substantially the same outer diameter as the support plate 3 and is formed in a disc shape with the axis At as a center. The substrate 4 is connected to the support plate 3 via the outer wall 5, thereby defining the plenum P that is a space inside together with the support plate 3. In the substrate 4, a plurality of through holes for inserting and supporting the plurality of premix tubes 2 are formed at positions corresponding to the through holes formed in the support plate 3.

The outer wall 5 connects an outer circumference of the support plate 3 and an outer circumference of the substrate 4. The outer side wall 5 has a cylindrical shape formed to have an inner diameter that is the same as an outer diameter of the support plate 3 and the substrate 4. The outer wall 5 is connected to the support plate 3 on the upstream side Da1. The outer wall 5 is connected to the substrate 4 at an end portion on the downstream side Da2. Therefore, the plenum P as a space that is defined inside the support plate 3 and the substrate 4 which are connected by the outer wall 5 is provided.

The partition plate 6 is a plate that partitions the plenum P into a fuel plenum PF and a cooling air plenum PA disposed on the downstream side Da2 of the fuel plenum PF. The partition plate 6 has substantially the same outer diameter as the support plate 3 and is formed in a disc shape with the axis At as a center. The partition plate 6 is disposed on the downstream side Da2 of the support plate 3 and on the upstream side Da1 of the substrate 4.

A circular through hole is formed at a center of the partition plate 6. The through hole is formed to have the same diameter as an outer diameter of the cooling air supply tube 9. The partition plate 6 is connected to the cooling air supply tube 9 in a state in which an end portion of the cooling air supply tube 9 is inserted into the through hole to protrude to the downstream side Da2. In the partition plate 6, a plurality of through holes for inserting and supporting the plurality of premix tubes 2 are formed at positions corresponding to the through holes formed in the support plate 3.

The baffle 7 is a plate that partitions the cooling air plenum PA into the upstream cooling air plenum PA1 and the downstream cooling air plenum PA2 disposed on the downstream side Da2 of the upstream cooling air plenum PA1. The baffle 7 has the same outer diameter as the partition plate 6 and is formed in a disc shape with the axis At as a center. The baffle 7 is disposed on the downstream side Da2 of the partition plate 6 and on the upstream side Da1 of the substrate 4.

In the baffle 7, a plurality of through holes for inserting and supporting the plurality of premix tubes 2 are formed at positions corresponding to the through holes formed in the support plate 3.

The baffle 7 includes a plurality of cooling holes 11 formed therein to allow the upstream cooling air plenum PA1 to communicate with the downstream cooling air plenum PA2. The cooling holes 11 are holes extending in the axial direction Da. That is, the cooling air CA introduced into the upstream cooling air plenum PA1 via the cooling air supply tube 9 is introduced into the downstream cooling air plenum PA2 through the plurality of cooling holes 11.

The premix tubes 2 are made of a tube material having a cylindrical shape extending in the axial direction Da. In the premix tubes 2, the compressed air A is introduced from the upstream side Da1, and a mixed gas of the compressed air A and the fuel gas F is discharged from the downstream side Da2. In the premix tubes 2, the end portions on the upstream side Da1 are supported by the support plate 3, and the end portions on the downstream side Da 2 are supported by the substrate 4.

The premix tubes 2 of the present embodiment are fixed so that the end portions on the upstream side Da1 do not protrude from the support plate 3 to the upstream side Da1 and are substantially coplanar therewith. The premix tubes 2 are fixed so that the end portions on the downstream side Da2 do not protrude from the substrate 4 to the downstream side Da2 and are substantially coplanar therewith. In each of the premix tubes 2, a fuel introduction hole 12 penetrating the premix tube 2 inward and outward in the radial direction is formed at a portion positioned in the fuel plenum PF.

The fuel introduction hole 12 is a through hole that allows the fuel gas F to flow into the premix tube 2 in the plenum P. The fuel introduction hole 12 has a circular cross-sectional shape and penetrates the premix tube 2 in the radial direction. The fuel introduction hole 12 is formed on the upstream side Da1 with respect to the partition plate 6. A position of the fuel introduction hole 12 in the axial direction Da is the same in all the premix tubes 2.

A plurality of cooling air discharge holes 13 penetrating the plenum P inward and outward are formed in the outer wall 5. The cooling air discharge holes 13 are formed at portions positioned in the downstream cooling air plenum PA2. The plurality of cooling air discharge holes 13 are formed at regular intervals in the circumferential direction around the axis At.

Figure 3:
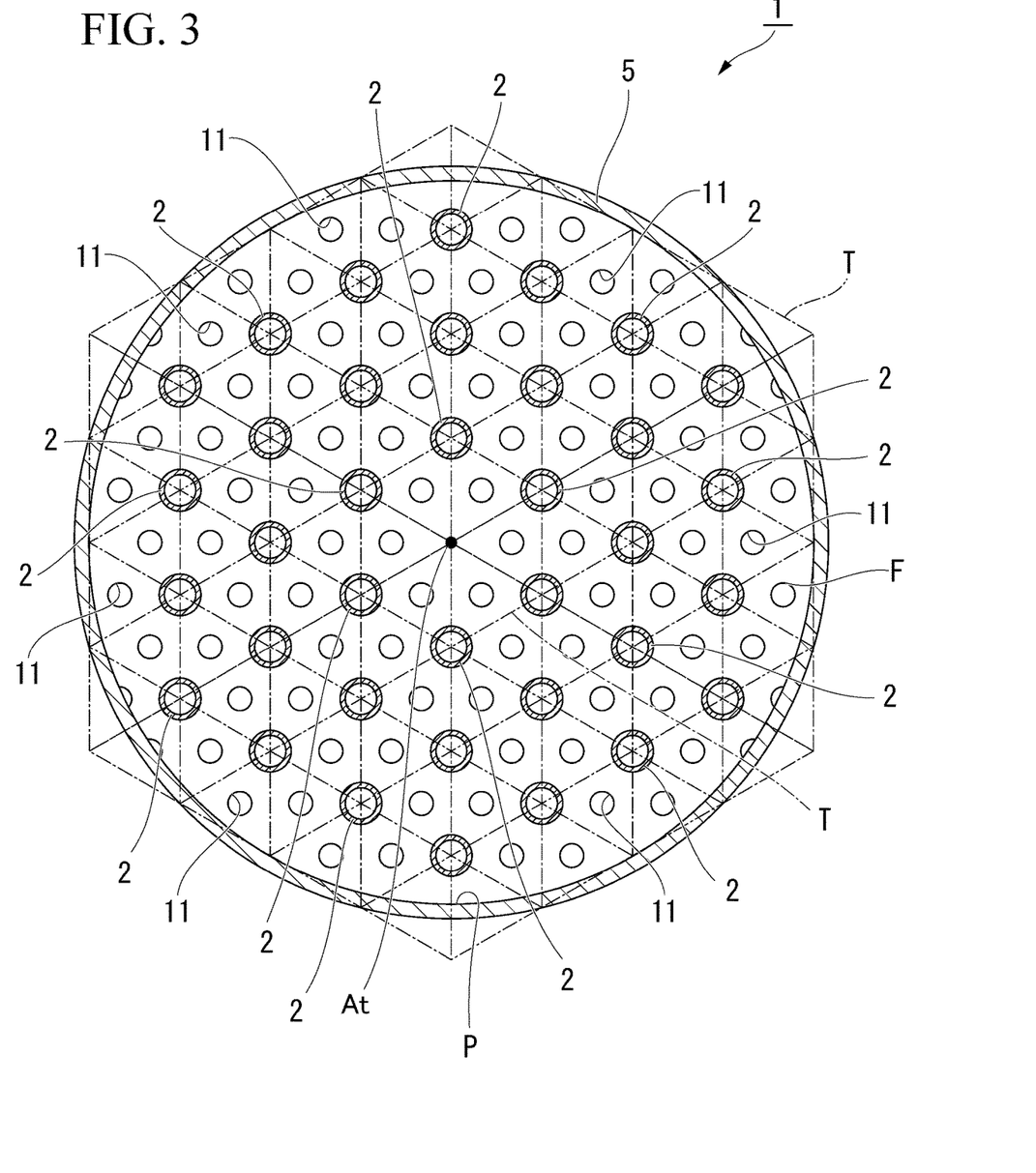
FIG. 3 is a cross-sectional view taken along line in FIG. 2 and showing the fuel injector of the first embodiment of the present invention.

The plurality of premix tubes 2 are provided with respect to the support plate 3 and the substrate 4. All of the plurality of premix tubes 2 are formed to have the same cross-sectional shape and the same length. As shown in FIG. 3, when viewed from the axial direction Da, when a cross-sectional region of the plenum P perpendicular to the axis At is partitioned such that a plurality of virtual equilateral triangles T are spread with the axis At as a center, the plurality of premix tubes 2 are disposed at positions of vertices of the virtual equilateral triangles T. The virtual equilateral triangles T are the plurality of equilateral triangles disposed to spread radially with the axis At as the center on a virtual plane which is a cross-sectional region of the plenum P perpendicular to the axis At. A length of one side of the virtual equilateral triangles T is determined from distances to which the premix tubes 2 are disposed from the axis At and distances between the premix tubes 2 adjacent to each other. In the present embodiment, the virtual equilateral triangles T having the same side length and the same shape are spread in the cross-sectional region of the plenum P.

The plurality of premix tubes 2 are disposed at the vertices of the virtual equilateral triangles T and thus are disposed so that the number gradually increases going radially toward the radial outer side with the axis At as a center.

The plurality of cooling holes 11 are disposed at central positions of the virtual equilateral triangles T when viewed from the axial direction Da.

Next, operations of the fuel injector 1 will be described.

In the fuel injector 1 of the present embodiment, the fuel gas F is introduced into the fuel plenum PF from the upstream side Da1 via the fuel supply tube 8. The fuel gas F introduced into the fuel plenum PF is taken into the premix tubes 2 through the fuel introduction holes 12. In the premix tubes 2 into which the fuel gas F has flowed, the compressed air A introduced from the upstream side Da1 and the fuel gas F are mixed, and the mixed gas is injected from the downstream side Da2.

In the fuel injector 1 of the present embodiment, the cooling air CA is introduced from the upstream side Da1 to the upstream cooling air plenum PA1 via the cooling air supply tube 9. The cooling air CA introduced into the upstream cooling air plenum PA1 is injected from the plurality of cooling holes 11 and then collides with the substrate 4. As described above, the cooling air CA is injected from the cooling holes 11, and thereby the substrate 4 can be cooled in the same manner as impingement cooling. That is, at least some of the cooling holes 11 are impingement holes.

The cooling air CA used for cooling the substrate 4 is discharged outward in the radial direction from the cooling air discharge holes 13.

According to the above-described embodiment, the cooling air CA introduced into the upstream cooling air plenum PA1 is injected toward the substrate 4 through the cooling holes 11 of the baffle 7, and thereby the substrate 4 that reaches a high temperature can be efficiently cooled. That is, a flame generated by an injection of the fuel gas F and the compressed air A becomes an adhering flame that adheres to an outlet (injection hole) of the premix tube 2, and the substrate 4 can be actively cooled when the substrate 4 reaches a high temperature.

Also, the compressed air A generated by the compressor 51 is extracted, the compressed air A extracted using the forced air-cooling compressor 74 of the cooling device 54 is re-pressurized, and thereby cooling air CA having a higher pressure than that of the extracted compressed air can be supplied.

Also, the compressed air A is cooled using the cooler 73, and thereby the cooling air CA having a lower temperature than that of the extracted compressed air A can be supplied.

Further, the cooling air supply tube 9 is disposed coaxially with the fuel supply tube 8 on a radial inner side of the fuel supply tube 8, and thereby an increase in temperature of the cooling air CA can be inhibited. That is, the cooling air supply tube 9 can be connected to the plenum P without being exposed to the compressed air A that is higher in temperature than that of the fuel gas F.

Second Embodiment

Hereinafter, a fuel injector 1B of a second embodiment of the present invention will be described in detail with reference to the drawings. The present embodiment will be described mainly focusing on differences from the first embodiment described above, and description on similar portions will be omitted.

Figure 4:
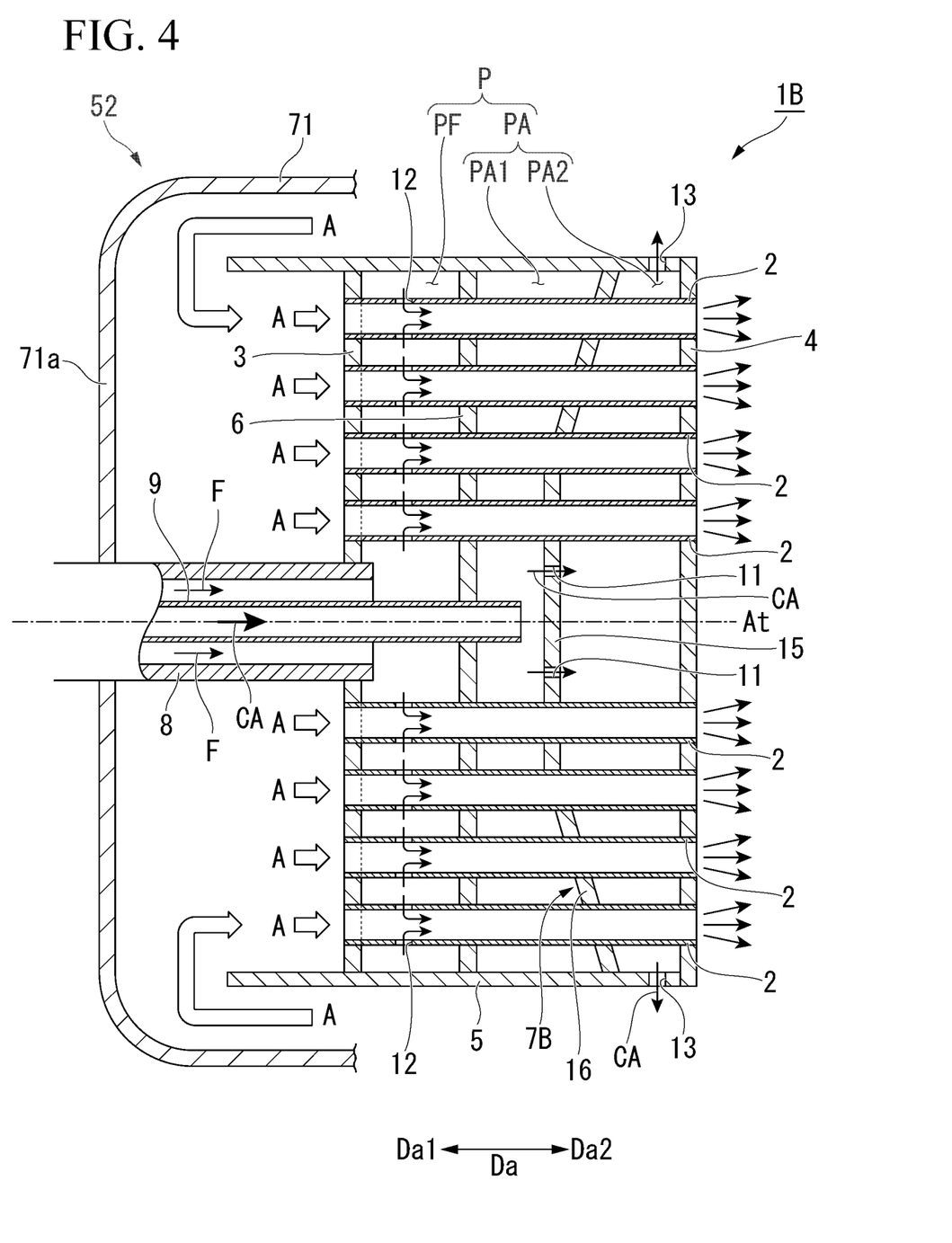
FIG. 4 is a cross-sectional view taken along line in FIG. 2 and showing a fuel injector of a second embodiment of the present invention.

As shown in FIG. 4, the fuel injector 1B of the present embodiment is different from the fuel injector of the first embodiment in a shape of the baffle.

A baffle 7B of the present embodiment includes a baffle main body 15 disposed radially inside, and an inclined part 16 disposed radially outward from the baffle main body 15.

The diameter of the baffle main body 15 is smaller than the diameter of a substrate 4. The diameter of the baffle main body 15 can be set to about ⅓ of the diameter of the substrate 4. A plurality of cooling holes 11 similar to those in the baffle 7 of the first embodiment are formed in the baffle main body 15.

The inclined part 16 is a plate-shaped member formed to connect an outer circumference of the baffle main body 15 and an inner circumferential surface of an outer wall 5. The inclined part 16 is inclined radially outward on a downstream side Da2. In other words, the inclined part 16 is formed to gradually increase in diameter toward the downstream side Da2. The cooling hole 11 is not formed in the inclined part 16.

According to the above-described embodiment, a cooling air CA introduced into an upstream cooling air plenum PA1 is injected from the plurality of cooling holes 11 to a downstream cooling air plenum PA2, and then flows outward in the radial direction along the inclined part 16 while cooling a vicinity of a center of the substrate 4. That is, the cooling air CA introduced into the downstream cooling air plenum PA2 is oriented outward in the radial direction along the inclined part 16 of the baffle 7. Thereby, not only the substrate 4 but also premix tubes 2 in the downstream cooling air plenum PA2 can be cooled.

Third Embodiment

Hereinafter, a fuel injector 1C of a third embodiment of the present invention will be described in detail with reference to the drawings. The present embodiment will be described mainly focusing on differences from the first embodiment described above, and description on similar portions will be omitted.

Figure 5:
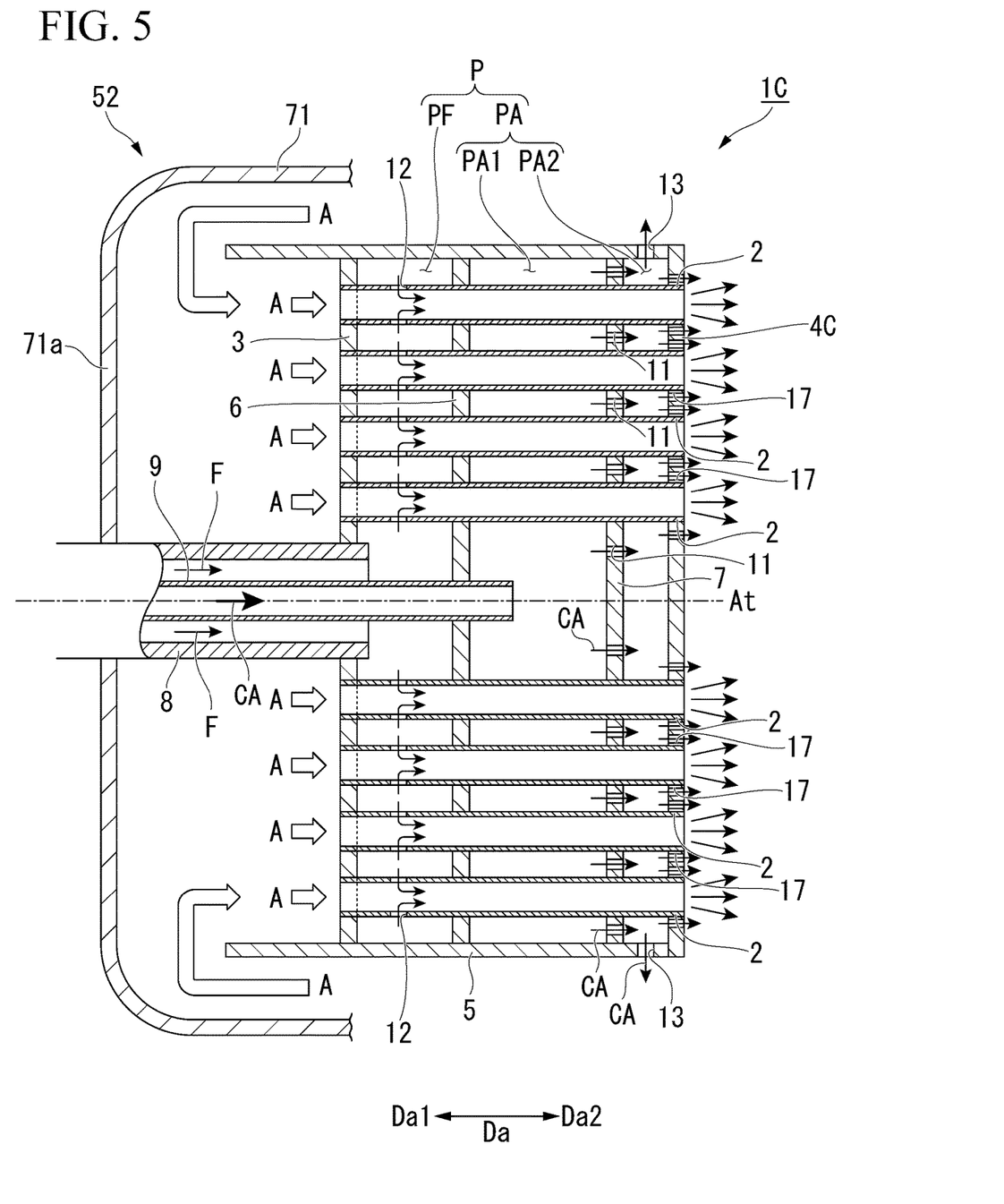
FIG. 5 is a cross-sectional view taken along line in FIG. 2 and showing a fuel injector of a third embodiment of the present invention.

As shown in FIG. 5, a second cooling air discharge hole 17 is formed in a substrate 4C of the present embodiment. That is, the fuel injector 1C of the present embodiment includes the second cooling air discharge hole 17 formed in the substrate 4 in addition to a cooling air discharge hole 13 formed in an outer wall 5. Further, the cooling air discharge hole 13 in the outer wall 5 may be omitted.

The second cooling air discharge hole 17 is a through hole extending in an axial direction Da. A position of the second cooling air discharge hole 17 of the present embodiment when viewed from the axial direction Da is different from a position of a cooling hole 11 of a baffle 7.

According to the above-described embodiment, a flame generated by an injection of a fuel gas F and a compressed air A can be prevented from adhering to an outlet of a premix tube 2. Also, even when a flame adheres thereto, the temperature of the flame itself can be lowered.

Also, the position of the second cooling air discharge hole 17 when viewed from the axial direction Da is different from the position of the cooling hole 11 of the baffle 7, and thereby discharge of the cooling air CA without colliding with the substrate 4 can be suppressed.

Fourth Embodiment

Hereinafter, a fuel injector 1D of a fourth embodiment of the present invention will be described in detail with reference to the drawings. The present embodiment will be described mainly focusing on differences from the first embodiment described above, and description on similar portions will be omitted.

Figure 6:
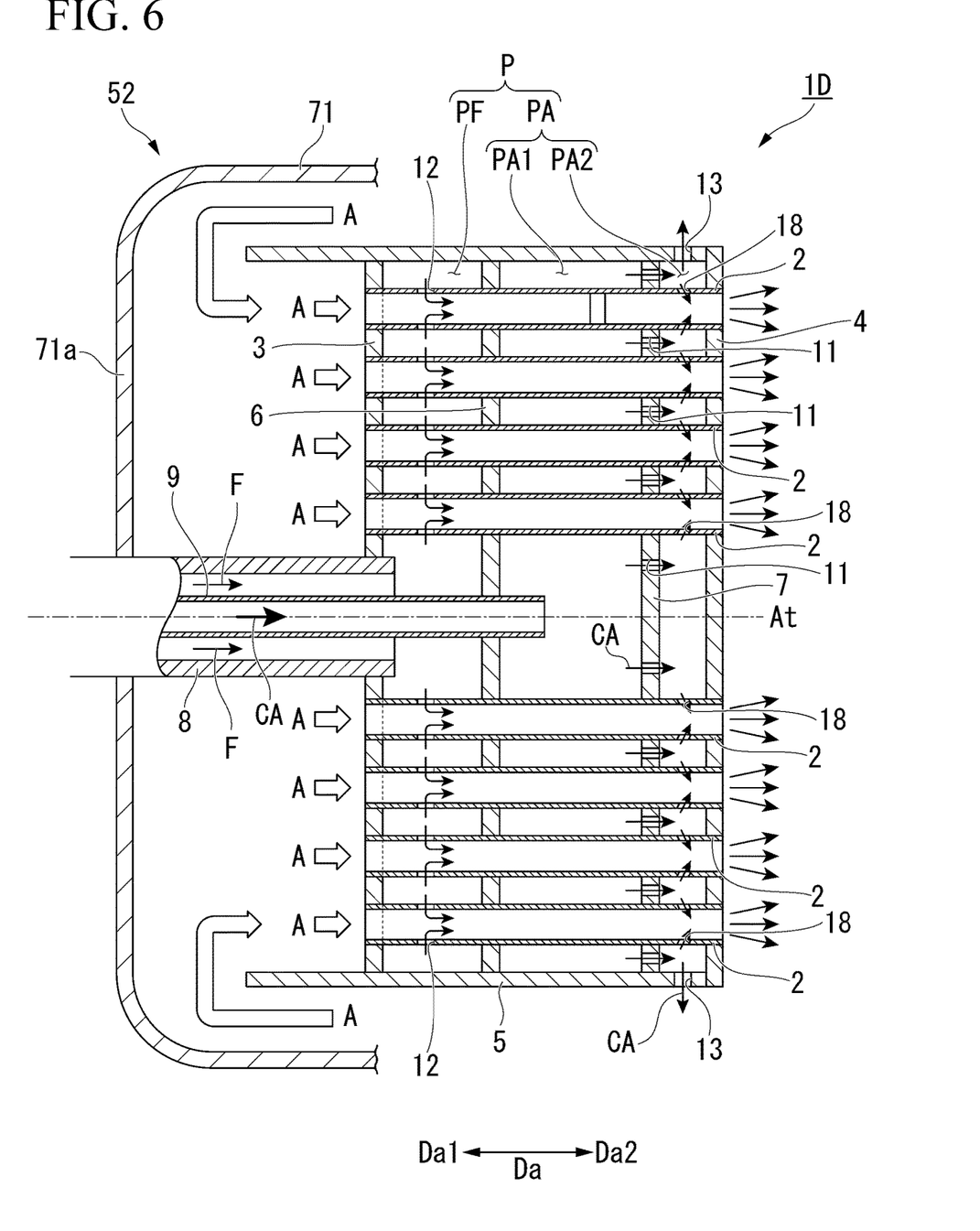
FIG. 6 is a cross-sectional view taken along line in FIG. 2 and showing a fuel injector of a fourth embodiment of the present invention.

As shown in FIG. 6, in a premix tube 2 of the fuel injector 1D of the present embodiment includes a cooling air introduction hole 18 penetrating the premix tube 2 inward and outward is formed at a portion positioned in a downstream cooling air plenum PA2. The cooling air introduction hole 18 is a through hole that allows a cooling air CA to flow into the premix tube 2 in the downstream cooling air plenum PA2.

The cooling air introduction hole 18 has a circular cross-sectional shape and penetrates the premix tube 2 in a radial direction. The cooling air introduction hole 18 is formed on a downstream side Da2 with respect to a baffle 7. The position of the cooling air introduction hole 18 in an axial direction Da is the same in all the premix tubes 2.

The cooling air introduction hole 18 is oriented such that the cooling air CA flows toward the downstream side Da2. In other words, a central axis of the cooling air introduction hole 18 is inclined to the downstream side Da2 from an outer circumferential surface of the premix tube 2 toward an inner circumferential surface of the premix tube 2.

According to the above-described embodiment, a portion of the cooling air CA that has cooled the substrate 4 is introduced into the premix tube 2, and thereby a flame moving upstream can be suppressed.

Fifth Embodiment

Hereinafter, a fuel injector 1E of a fifth embodiment of the present invention will be described in detail with reference to the drawings. The present embodiment will be described mainly focusing on differences from the first embodiment described above, and description on similar portions will be omitted.

Figure 7:
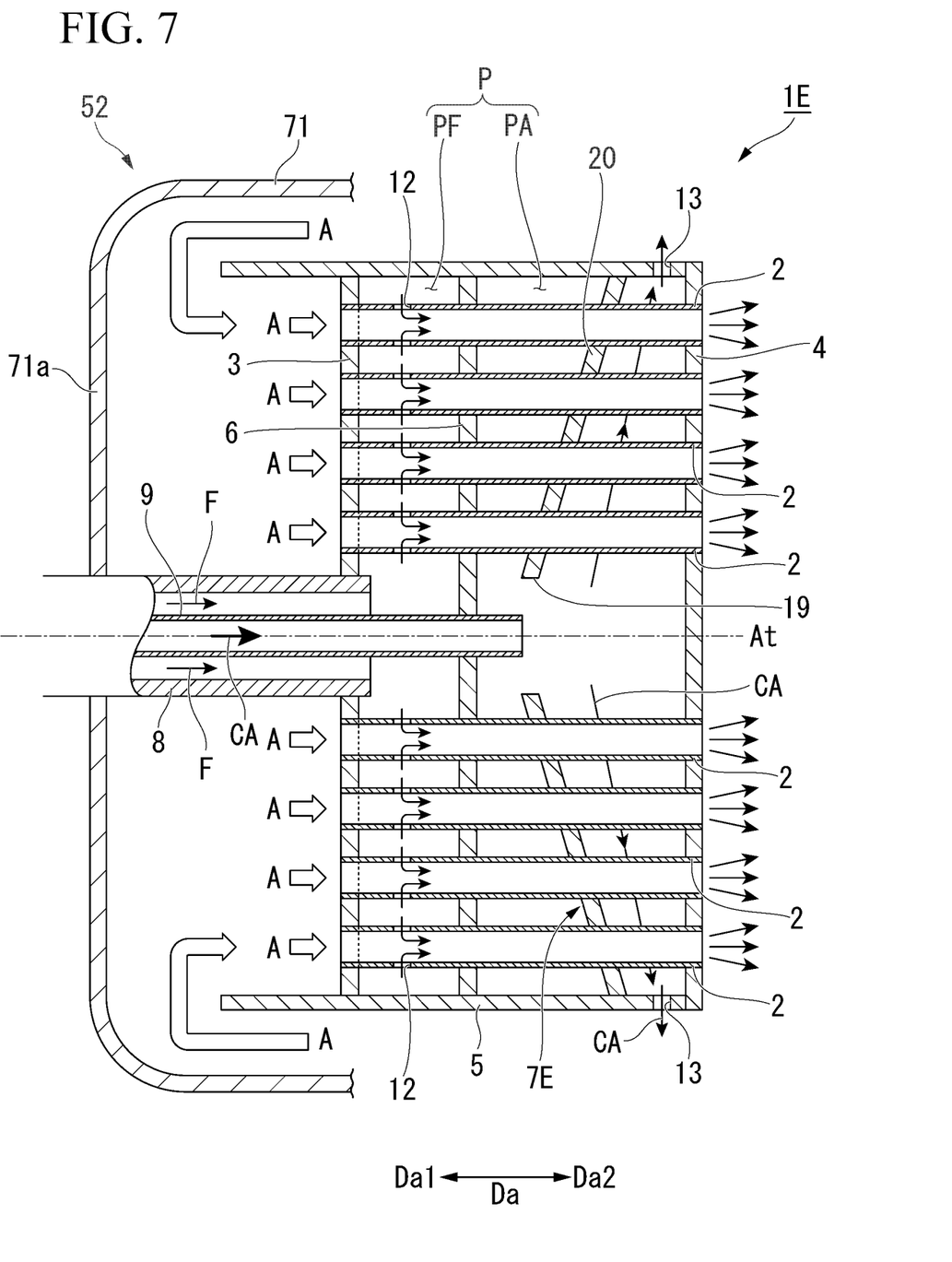
FIG. 7 is a cross-sectional view taken along line in FIG. 2 and showing a fuel injector of a fifth embodiment of the present invention.

As shown in FIG. 7, a baffle 7E of the present embodiment is provided on a downstream side Da2 with respect to an end portion on the downstream side Da2 of a cooling air supply tube 9. The baffle 7E is not formed to partition a cooling air plenum PA, and a cooling air inflow hole 19 is formed at a center portion thereof.

The baffle 7E includes an enlarged diameter part 20 which is inclined radially outward on the downstream side Da2 with an axis At as a center and connected to an outer wall 5, and the cooling air inflow hole 19 formed at a center in the radial direction of the enlarged diameter part 20.

A position in an axial direction Da of an end portion (the cooling air inflow hole 19) on an upstream side Da1 of the enlarged diameter part 20 is the same as a position of an end portion on the downstream side Da2 of the cooling air supply tube 9, or on the slightly downstream side Da2.

A hole diameter of the cooling air inflow hole 19 is slightly larger than an outer diameter of the cooling air supply tube 9. The cooling air inflow hole 19 has a circular shape, and a center thereof is disposed on the axis At.

The cooling air CA supplied from the cooling air supply tube 9 flows into the cooling air inflow hole 19 and then collides with a substrate 4.

According to the above-described embodiment, the cooling air CA introduced into the cooling air plenum PA flows from the cooling air inflow hole 19 to the downstream side Da2 of the baffle 7E. The cooling air CA that has flowed in flows outward in the radial direction along the enlarged diameter part 20 while cooling a vicinity of a center of the substrate 4. That is, the cooling air CA is oriented outward in the radial direction along the enlarged diameter part 20 of the baffle 7E. Thereby, not only the substrate 4 but also a premix tube 2 in the cooling air plenum PA can be cooled.

Although embodiments of the present invention have been described in detail with reference to the drawings, configurations, combinations thereof, or the like in the respective embodiments are examples, and additions, omissions, substitutions, and other changes to the configurations can be made without departing from the gist of the present invention. The present invention is not to be considered as being limited by the embodiments and is only limited by the scope of the claims.

Further, in the above-described embodiment, the fuel supply tube 8 and the cooling air supply tube 9 are configured to be coaxially disposed, but the present invention is not limited thereto. For example, the cooling air supply tube 9 may be connected to the outer wall 5 and the cooling air CA may be configured to be introduced into the cooling air plenum PA via through holes formed in the outer wall 5.

Also, in the above-described embodiment, although one fuel injector 1 is disposed in one combust liner 69, but the present invention is not limited thereto. For example, a plurality of fuel injectors having a cylindrical outer wall may be disposed in the combustor liner 69.

Figure 8:
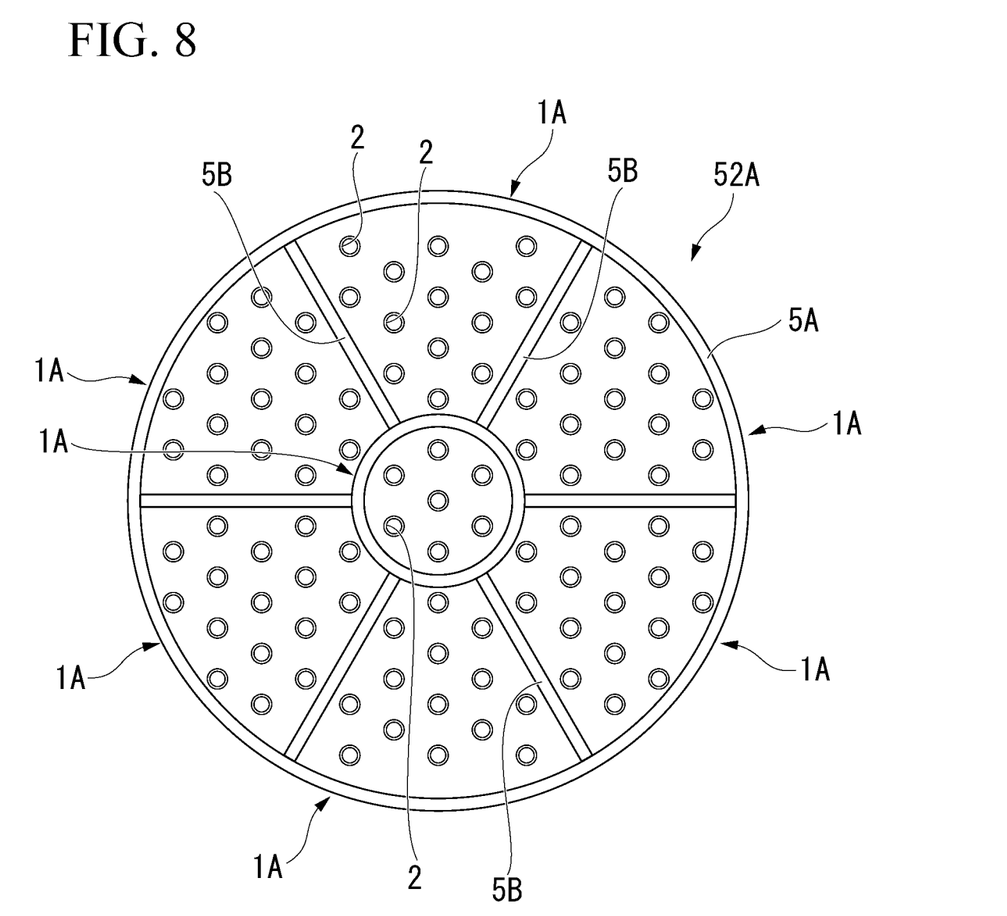
FIG. 8 is a front view of another embodiment of a fuel injector of the present invention when viewed from a downstream side.

Further, when a plurality of fuel injectors are disposed in one combustor, a cross-sectional shape of each fuel injector is not necessary to be circular. For example, as shown in FIG. 8, a cylindrical outer wall 5A and a plurality of walls 5B that partition the inside of the outer wall 5A in the circumferential direction may be provided so that a plurality of fan-shaped fuel injectors 1A are provided in one combustor 52A.

REFERENCE SIGNS LIST

1 Fuel injector
2 Premix tube
3 Support plate
4 Substrate
5, 5A Outer wall
5B Wall
6 Partition plate
7 Baffle
8 Fuel supply tube
9 Cooling air supply tube
11 Cooling hole
12 Fuel introduction hole
13 Cooling air discharge hole
15 Baffle main body
16 Inclined part
17 Second cooling air discharge hole
18 Cooling air introduction hole
19 Cooling air inflow hole
20 Enlarged diameter part
51 Compressor
52 Combustor
53 Turbine
54 Cooling device
67 Intermediate casing
72 Air extraction part
73 Cooler
74 Forced air-cooling compressor
76 Cooling air introduction part
100 Gas turbine
A Compressed air
Ar Axis
At Axis
CA Cooling air
Da Axial direction
Da1 Upstream side
Da2 Downstream side
G Combustion gas
F Fuel gas
P Plenum
PF Fuel plenum
PA Cooling air plenum
PA1 Upstream cooling air plenum
PA2 Downstream cooling air plenum

What is claimed is:

1. A fuel injector comprising: a fuel supply tube which has a tubular shape centered on an axis and into which a fuel gas is introduced from an upstream side in an axial direction in which the axis extends, a plurality of premix tubes which have a tubular shape extending in the axial direction and into which air is introduced from the upstream side; a support plate which supports a downstream side in the axial direction of the fuel supply tube and upstream end portions of the plurality of premix tubes, and oriented perpendicularly to said axis; a substrate which supports downstream end portions of the plurality of premix tubes, and oriented perpendicularly to said axis; an outer wall which is cylindrical, which connects the support plate to the substrate and forms a plenum inside together with the support plate and the substrate, a partition plate which partitions the plenum into a fuel plenum and a cooling air plenum disposed downstream of the fuel plenum, and oriented perpendicularly to said axis; a baffle, disposed downstream of the partition plate and upstream of the substrate, with at least a partially inclined portion radially outward on the downstream side with respect to said axis, and having holes through which premix tubes pass therein, and cooling holes are not formed in the al least partially inclined therein, and cooling holes are not formed in the at least partially inclined portion and a cooling air supply tube which is configured to supply cooling aft to the upstream cooling air plenum, wherein an end portion on the downstream side of the fuel supply tube opens in the fuel plenum; and at least one fuel introduction hole which penetrates each of the premix tubes inward and outward is formed at a portion positioned in the fuel plenum of the premix tube, wherein the baffle includes: a baffle body in which the cooling holes are formed and which is provided radially inside and attached to said outer wall with the axis as a center.

2. The fuel injector according to claim 1, wherein at least some of the plurality of cooling holes are impingement holes.

3. The fuel injector according to claim 1, further comprising a plurality of cooling air discharge holes which is formed in the substrate and configured to discharge the cooling air from the downstream cooling air plenum to the downstream side of the substrate.

4. The fuel injector according to claim 1, wherein a cooling air introduction hole penetrating the premix tube inward and outward is formed at a portion positioned in the downstream cooling air plenum of the premix tube.

5. The fuel injector according to claim 1, wherein the cooling air supply tube is disposed coaxially with the fuel supply tube on a radial inner side of the fuel supply tube.

6. A gas turbine comprising:
a compressor which is configured to generate compressed air in which air is compressed;
a combustor which includes the fuel injector according to claim 1 and mixes fuel with the compressed air to generate a combustion gas;
an air extraction part which is configured to extract the compressed air generated by the compressor;
a forced air-cooling compressor which is configured to further compress the extracted compressed air; and
a cooling air introduction part which introduces the cooling air generated by the forced air-cooling compressor into the fuel injector.

7. The gas turbine according to claim 6, further comprising a cooler which is configured to cool the compressed air extracted by the air extraction part.

8. A gas turbine comprising:
a compressor which is configured to generate compressed air in which air is compressed;
a combustor which includes the fuel injector according to claim 2 and mixes fuel with the compressed air to generate a combustion gas;
an air extraction part which is configured to extract the compressed air generated by the compressor;
a forced air-cooling compressor which is configured to further compress the extracted compressed air; and
a cooling air introduction part which introduces the cooling air generated by the forced air-cooling compressor into the fuel injector.

9. A gas turbine comprising:
a compressor which is configured to generate compressed air in which air is compressed;
a combustor which includes the fuel injector according to claim 3 and mixes fuel with the compressed air to generate a combustion gas;
an air extraction part which is configured to extract the compressed air generated by the compressor;
a forced air-cooling compressor which is configured to further compress the extracted compressed air; and
a cooling air introduction part which introduces the cooling air generated by the forced air-cooling compressor into the fuel injector.

10. A gas turbine comprising:
a compressor which is configured to generate compressed air in which air is compressed;
a combustor which includes the fuel injector according to claim 4 and mixes fuel with the compressed air to generate a combustion gas;
an air extraction part which is configured to extract the compressed air generated by the compressor;
a forced air-cooling compressor which is configured to further compress the extracted compressed air; and
a cooling air introduction part which introduces the cooling air generated by the forced air-cooling compressor into the fuel injector.

11. A gas turbine comprising:
a compressor which is configured to generate compressed air in which air is compressed;
a combustor which includes the fuel injector according to claim 5 and mixes fuel with the compressed air to generate a combustion gas;
an air extraction part which is configured to extract the compressed air generated by the compressor;
a forced air-cooling compressor which is configured to further compress the extracted compressed air; and
a cooling air introduction part which introduces the cooling air generated by the forced air-cooling compressor into the fuel injector.

* * * * *